(12) United States Patent
Tandi

(10) Patent No.: US 10,255,169 B2
(45) Date of Patent: Apr. 9, 2019

(54) TESTING APPLICATIONS USING APPLICATION FEATURES GROUPED INTO CATEGORIES OF HUMAN SENSES

(71) Applicant: Wipro Limited, Bangalore (IN)

(72) Inventor: Uday Shreepad Tandi, Bangalore (IN)

(73) Assignee: Wipro Limited, Bangalore (IN)

( * ) Notice: Subject to any disclaimer, the term of this patent is extended or adjusted under 35 U.S.C. 154(b) by 8 days.

(21) Appl. No.: 15/355,362

(22) Filed: Nov. 18, 2016

(65) Prior Publication Data

US 2018/0089069 A1 Mar. 29, 2018

(30) Foreign Application Priority Data

Sep. 26, 2016 (IN) .............................. 201641032857

(51) Int. Cl.
*G06F 8/74* (2018.01)
*G06F 8/75* (2018.01)
*G06F 11/36* (2006.01)

(52) U.S. Cl.
CPC ............ *G06F 11/3684* (2013.01); *G06F 8/74* (2013.01); *G06F 8/75* (2013.01)

(58) Field of Classification Search
CPC ............ G06F 11/3668; G06F 11/3676; G06F 11/3684; G06F 11/263; G06F 8/74; G06F 8/75

See application file for complete search history.

(56) References Cited

U.S. PATENT DOCUMENTS 7,979,845 B2 * 7/2011 Marimuthu ......... G06F 11/3684
717/124
9,058,561 B2 6/2015 Stacy et al.
(Continued)

FOREIGN PATENT DOCUMENTS

WO WO 2007/016309 A2 2/2007
WO WO 2012/168798 A2 12/2012
WO WO 2014/174362 10/2014

OTHER PUBLICATIONS

Dave, PH and HB Dave. "Design and Analysis of Algorithms" 2013 Dorling Kindersley (India) Pvt. Ltd. Second edition. Chapter 13 "Natural Algorithms—GA, SA, ANN, TS". pp. 1-4.*
(Continued)

*Primary Examiner* — Emerson C Puente
*Assistant Examiner* — Erika Kretzmer
(74) *Attorney, Agent, or Firm* — Finnegan, Henderson, Farabow, Garrett & Dunner LLP

(57) ABSTRACT

A method to test a software application based on grouping application features based on categories of the human mind and human senses. Methods and systems for testing an application including generating test scenarios to test an application, the method comprising: extracting a plurality of features associated with the application; determining a match for each of the plurality of features with at least one of a plurality of predefined application features using a list of predefined application features mapped with a plurality of groups representing human senses such as sight, hearing, touch, and balance; creating a data structure having nodes arranged in layers based on the match determined for each of the plurality of features with at least one of the plurality of groups; and generating a plurality of test scenarios for the application based on the data structure based on a combinatorial analysis at each of the plurality of nodes of the data structure.

16 Claims, 8 Drawing Sheets

(56) References Cited

U.S. PATENT DOCUMENTS

| | | | |
|---|---|---|---|
| 2006/0224921 A1* | 10/2006 | Marimuthu | G06F 11/3684 |
| | | | 714/25 |
| 2008/0125110 A1 | 5/2008 | Ritter | |
| 2013/0018832 A1* | 1/2013 | Ramanathan | G06N 3/08 |
| | | | 706/25 |
| 2014/0165043 A1 | 6/2014 | Pasala et al. | |
| 2015/0317241 A1* | 11/2015 | Akiyama | G06F 11/3684 |
| | | | 714/38.1 |

OTHER PUBLICATIONS

Method and System for Optimizing Combinatorial Test Design (CTD) to Test a Mobile Application in Different Devices, *IP.COM Journal*, IP.COM Inc., Feb. 10, 2015, 2 pages.

Somé, S.S., et al., "An approach for supporting system-level test scenarios generation from textual use cases", *Proceedings ACM SAC*, Mar. 16, 2008, pp. 724-729.

Extended European Search Report issued in the European Patent Office in counterpart European Application No. 16207201.1, dated Oct. 9, 2017, 14 pages.

\* cited by examiner

| Human Sense | Characteristics | Application Features | Hidden Layer | Sub-Hidden Layer |
|---|---|---|---|---|
| Sight | Interpret info | User Interface | A | A1 |
| | | Image from camera | | A2 |
| | | Security | | A3 |
| | Shape | Graphics | | A4 |
| | Size | Resolution | | A5 |
| | | Fonts | | A6 |
| | | Images | | A7 |
| | Color | Color combinations | | A8 |
| Smell | Cognition | History | B | B1 |
| | Memory | Cache | | B2 |
| | | App Size | | B3 |
| | | Database Size | | B4 |
| Hear | Hear | Sounds | C | C1 |
| | | Voice Recognition | | C2 |
| | Balance | Screen Orientation | | C3 |
| Touch | Temperature | Sensors | D | D1 |
| | Pressure | Touch Screen | | D2 |
| | | 3D Touch | | D3 |
| | | Vibrations | | D4 |
| Taste | Flavor | iOS | E | E1 |
| | | Android | | E2 |
| | Quantity | Load | | E3 |
| | Like | Design for particular user community | | E4 |
| | Dis-like | Non-Functional features | | E5 |

FIG. 6A

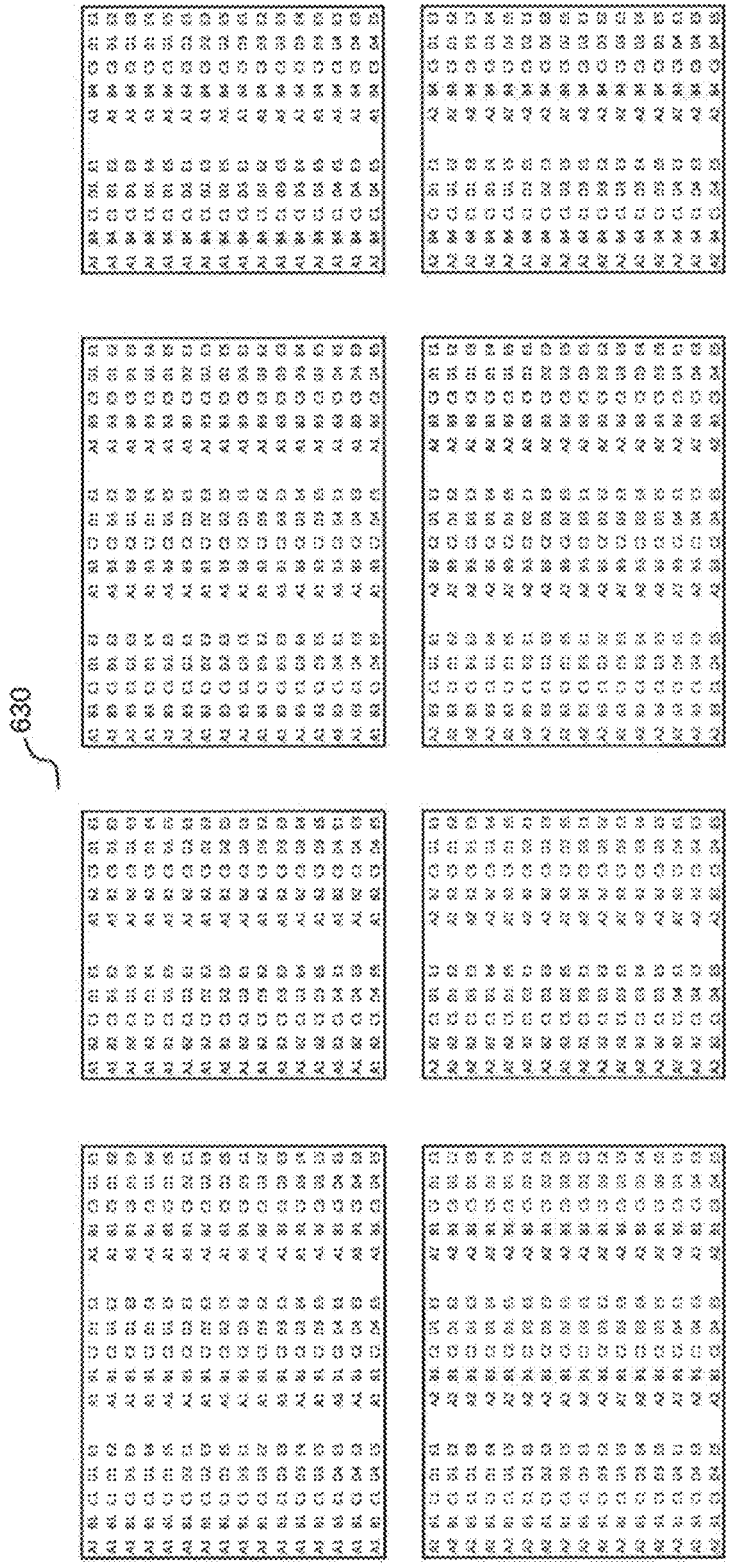

TESTING APPLICATIONS USING APPLICATION FEATURES GROUPED INTO CATEGORIES OF HUMAN SENSES

TECHNICAL FIELD

This disclosure relates generally to testing of applications and more particularly to methods and systems for testing applications using human senses.

BACKGROUND

Conventional application testing systems test applications through traditional ways of identifying scenarios. These traditional ways include manually picking through the use case or through functional breakdown. These traditional ways include methodical step by step process and may have loopholes as they do not ideally reap the real time behavior of applications. This causes issues as these traditional ways do not usually cover the way information travels across the application being tested. This further hampers performance of the testing phases.

SUMMARY

In one embodiment, a method of generating test scenarios to test an application is disclosed. The method includes generating test scenarios to test an application, the method comprising: extracting, via an application testing device, a plurality of features associated with the application; determining, via the application testing device, a match for each of the plurality of features with at least one of a plurality of human senses using a list of predefined application features mapped with the plurality of human senses; creating, via the application testing device, a neural network based on the match determined for each of the plurality of features with at least one of the plurality of human senses; and generating, via the application testing device, a plurality of test scenarios for the application based on the neural network.

In another embodiment, an application testing system for generating test scenarios to test and application is disclosed. The system includes at least one processors and a computer-readable medium. The computer-readable medium stores instructions that, when executed by the at least one processor, cause the at least one processor to perform operations that include generating test scenarios to test an application, extracting a plurality of features associated with the application; determining a match for each of the plurality of features with at least one of a plurality of human senses using a list of predefined application features mapped with the plurality of human senses; creating a neural network based on the match determined for each of the plurality of features with at least one of the plurality of human senses; and generating a plurality of test scenarios for the application based on the neural network.

In yet another embodiment, a non-transitory computer-readable storage medium for generating test scenarios to test an application is disclosed, which when executed by a computing device, cause the computing device to: extract, via an application testing device, a plurality of features associated with the application; determine, via the application testing device, a match for each of the plurality of features with at least one of a plurality of human senses using a list of predefined application features mapped with the plurality of human senses; create, via the application testing device, a neural network based on the match determined for each of the plurality of features with at least one of the plurality of human senses; and generate, via the application testing device, a plurality of test scenarios for the application based on the neural network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 6A, 6B, and 6C illustrate creation of a neural network using mapping of application features to human sense characteristics and generation of test case scenarios for testing a mobile application, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
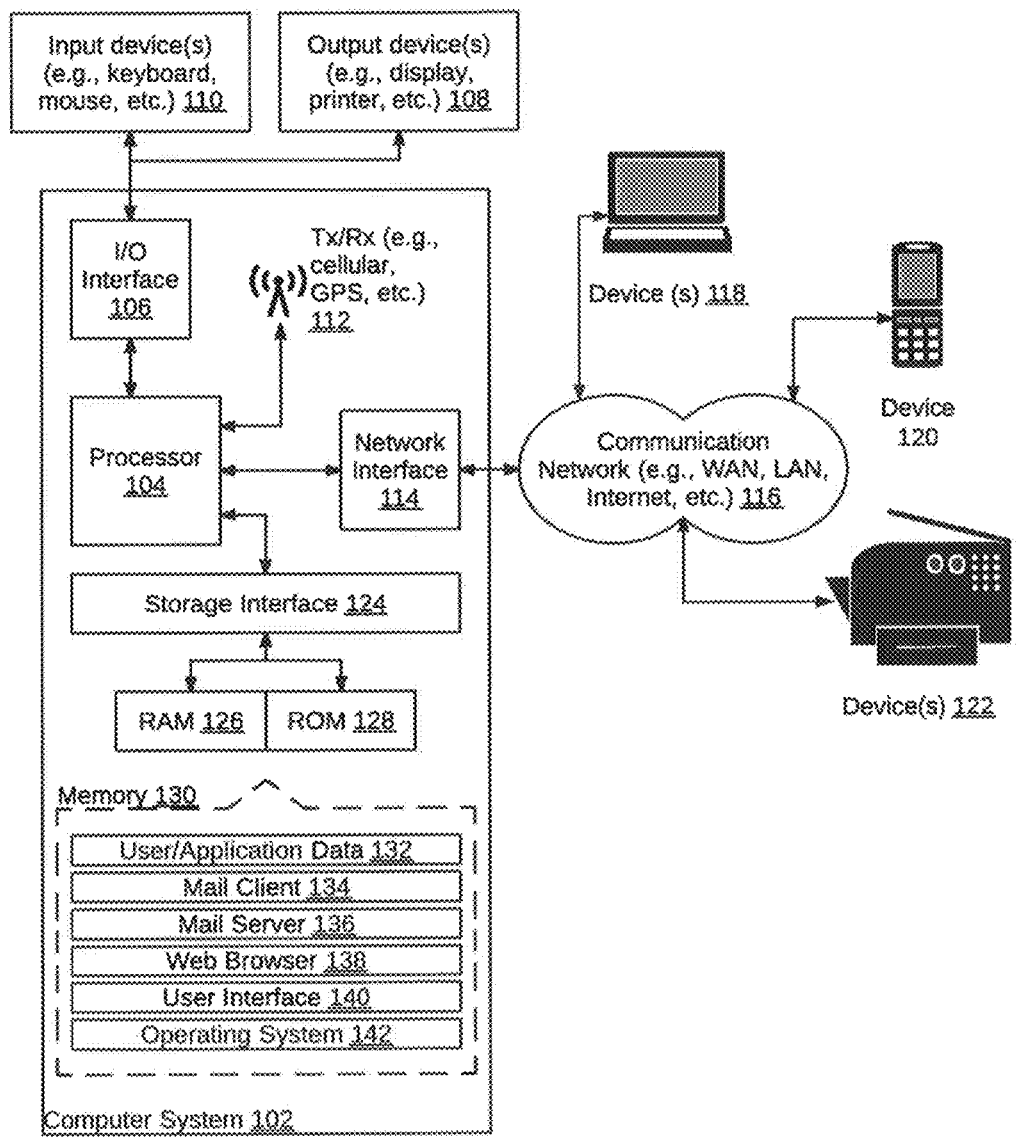
FIG. 1 illustrates a block diagram of an exemplary computer system for implementing various embodiments.

Additional illustrative embodiments are listed below. In one embodiment, a block diagram of an exemplary computer system for implementing various embodiments is disclosed in FIG. 1. Computer system 102 may comprise a central processing unit ("CPU" or "processor") 104. Processor 104 may comprise at least one data processor for executing program components for executing user- or system generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or ether line of processors, etc. Processor 104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 104 may be disposed in communication with one or more input/output (I/O) devices via an I/O interface 106. I/O interface 106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM) long-term evolution (LTE), WiMax, or the like), etc.

Using I/O interface 106, computer system 102 may communicate with one or more I/O devices. For example, an input device 110 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 108 may be a printer, fax machine, video display (e.g., cathode ray tube (CRT), liquid crystal display (LCD), light-emitting diode (LED), plasma, or the like), audio speaker, etc. In some embodiments, a transceiver 112 may be disposed in connection with processor 104. Transceiver 112 may facilitate various types of wireless transmission or reception. For example, transceiver 112 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 104 may be disposed in communication with a communication network 116 via a network interface 114. Network interface 114 may communicate with communication network 116. Network interface 114 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 116 may include, without limitation, a direct interconnection, local area network (LAN), wide area network (WAN), wireless network (e.g., using Wireless Application Protocol), the Internet, etc. Using network interface 114 and communication network 116, computer system 102 may communicate with devices 118, 120, and 122. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 102 may itself embody one or more of these devices.

In some embodiments, processor 104 may be disposed in communication with one or more memory devices (e.g., RAM 126, ROM 128, etc.) via a storage interface 124. Storage interface 124 may connect to memory devices 130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 130 may store a collection of program or database components, including, without limitation, an operating system 142, a user interface application 140, a web browser 138, a mail server 136, a mail client 134, a user/application data 132 (e.g., any data variables or data records discussed in this disclosure), etc. Operating system 142 may facilitate resource management and operation of the computer system 102. Examples of operating system 142 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 140 may facilitate display, execution, interaction, manipulation, or operation of program components through textual or graphical facilities. For example, user interfaces may provide computer interaction interface elements on a display system operatively connected to computer system 102, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 102 may implement web browser 138 stored program component. Web browser 138 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 102 may implement mail server 136 stored program component. Mail server 136 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 102 may implement mail client 134 stored program component. Mail client 134 may be a mail viewing application, such as Apple Mail, Microsoft Entourage, Microsoft Outlook, Mozilla Thunderbird, etc.

In some embodiments, computer system 102 may store user/application data 132, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller, Hence, references to specific functional units are only to be seen as references to suitable means for providing the described functionality, rather than indicative of a strict logical or physical structure or organization.

Figure 2:
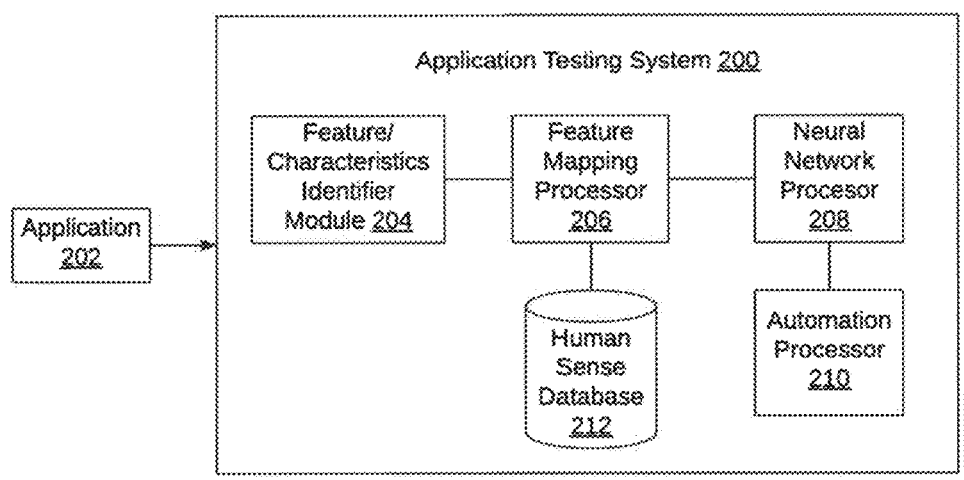
FIG. 2 is a block diagram illustrating an application testing system that generates test scenarios to test an application, in accordance with an embodiment.

Referring now to FIG. 2, a block diagram of an application testing system 200 that generates test scenarios to test an application 202 is illustrated, in accordance with an embodiment. Application 202, for example, may be, but is not limited to a desktop application, infrastructure application, or a gaming application. Application 202 is tested using a plurality of human senses, which may include the traditional human senses, for example, hearing, taste, sight, touch, and smell. The plurality of human senses may also include the non-traditional human senses, for example, themioception, Nociception, Equilibrioception, and Proprioception. The use of human sense to test an application enables evaluating more realistic behavior of an application, because the test scenarios are derived based on the way human mind thinks about the device on which the application sits.

Application 202 is taken for testing based on acceptance of human senses, i.e., the characteristics or features of application 202 that are assigned respectively to the human senses that are affected by them. To enable the same, application testing system 200 includes a feature/characteristics identifier module 204, a feature mapping processor 206, a neural network processor 208, and an automation processor 210.

Feature/characteristics identifier module 204 accepts application 202 and identifies the features in application 202 based on pre-defined rules regarding features identification. The list of identified features is then passed on to feature mapping processor 206, which is also the main rule engine. Feature mapping processor 206 also extracts a list of predefined human senses and associated human sense characteristics from a human sense database 212 simultaneously. Thereafter, the identified features of application 202 are matched to their responsive human senses provided by human sense database 212. This is further explained in detail in conjunction with FIGS. 3, 4, and 5.

After mapping is constructed, neural network processor 208 arranges these matches into a neural network format in sequences of the human senses and their respective application features. Finally, automation processor 210 computes various permutation and combination exercises along with the probability of trying all order of sequences to generate various test scenarios. This helps to achieve the maximum number of scenarios in order to implement end to end testing exercise and provide outcome of the said testing results and also feedbacks on areas to improve within application 202. This is further explained in detail in conjunction with FIGS. 3, 4, and 5.

Figure 3:
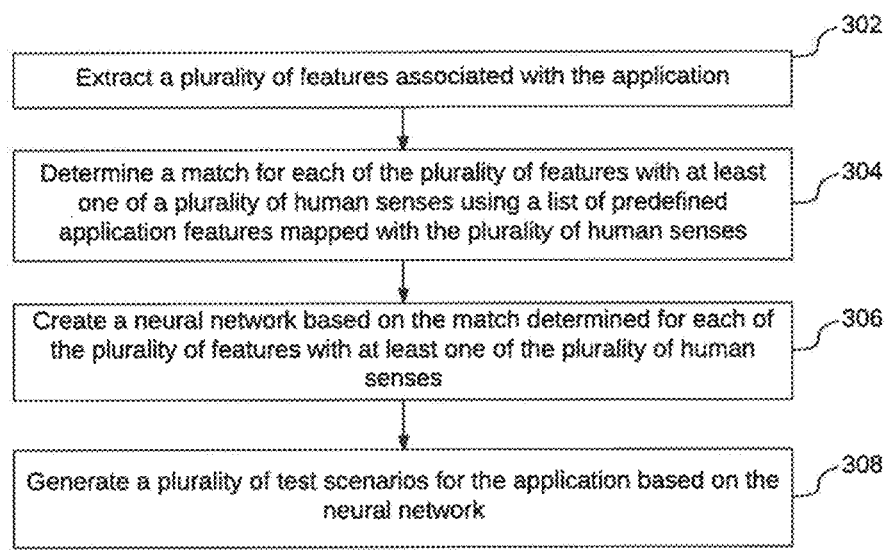
FIG. 3 illustrates a flowchart of a method for generating test scenarios to test an application, in accordance with an embodiment.

Referring now to FIG. 3, a flowchart of a method for generating test case scenarios for testing an application is illustrated, in accordance with an embodiment. The application, for example, may be, but is not limited to a desktop application, infrastructure application, or a gaming application. Moreover, the application may either be hosted within a premise or hosted on cloud. In other words, the application may be a thick client installed on a user device or may be a thin client hosted on cloud. Examples of the device, may include, but are not limited to mobile phones, laptops, personal computers, gaming consoles, navigation devices, phablets, and tablets. The application is tested using a plurality of human senses, which may include the traditional human senses, for example, hearing, taste, sight, touch, and smell. The plurality of human senses may also include the non-traditional human senses, for example, thermoception, Nociception, Equilibrioception, and Proprioception. The use of human sense to test an application enables evaluating more realistic behavior of an application, because the test scenarios are derived based on the way human mind thinks about the device on which the application sits.

Before an application is tested, a list that includes predefined application features mapped with a plurality of human senses is created. Examples of the predefined application features may include, but are not limited to user interface, images from camera, security, graphics, resolution, fonts, images, color combination, history, cache, application size, database size, sounds, voice recognition, screen orientation, sensors, touch screen, 3D touch, vibrations, iOS, Android, load, design for a particular user community, or any unrelated features. Predefined application features include generic application features, such that most of the applications include a subset of these features. However, it will be apparent to a person skilled in the art that the predefined application features are not limited to the above examples. The list may be modified based on new application features learnt by the system or added by an administrator.

In this list, one or more human sense characteristics associated with each of the plurality of human senses are mapped to one or more of the predefined application features. The human sense characteristics may include one or more of, but is not limited to interpretation of information, shape, size, color, cognition, memory, hear, balance, temperature, pressure, flavor, quantity, like, or dislike. By way of an example, following human sense characteristics: interpretation of information, shape, size, and color are associated with the human sense of 'sight' With regards to mapping of human sense characteristics to predefined features, by way of an example, the human sense characteristic of 'size' may be mapped to predefined application features of resolution, fonts, and images. This is further explained in detail in conjunction with exemplary embodiment given in FIGS. 5, 6A, 6B, and 6C.

Thereafter, at 302, a plurality of features of the application which is being tested are extracted. In an embodiment, it may first be ascertained whether the application is a mobile application, a desktop application, gaming application, or infrastructure application. Thereafter, the features may accordingly be extracted. The feature extraction may be performed by an application testing device. At 304, the list that includes mapping of the predefined application features with the one or more human sense characteristics is used to determine which of the plurality of features of the application that is being tested are present in the list. Accordingly, a match for each of the plurality of features with one or more human sense characteristics associated with the plurality of human senses is determined. By way of an example, the list includes ten predefined application features that are mapped to one or more human sense characteristics. Only five of these ten predefined application features are applicable to the application being currently tested. Therefore, the list is accordingly used to determine which of the human sense characteristics are mapped to these five features present in the application being currently tested.

After determining the match for each of the plurality of features with at least one of the plurality of human senses, a neural network is created at 306 based on the match. The neural network includes a plurality of hidden layers, such that, each of the plurality of hidden layers is associated with one of the plurality of human senses. By way of an example, if a neural network is created for the list of predefined application features mapped with the plurality of human senses, the neural network will include five hidden layers, such that there is one hidden layer each for sense of smell, hearing, sight, taste, and touch. Further, each hidden layer includes one or more sub-hidden layers, such that, each sub-hidden layer is associated with mapping of one of the human sense characteristics with one or more of the predefined application features. By way of an example, the human sense characteristic of size (which is associated with the human sense of sight) is mapped to the predefined application features of: resolution, fonts, and images. Thus, there would be three sub-hidden layers in this case: first for mapping of size to resolution, second for mapping of size to fonts, and third for mapping of size to images. Each sub-hidden layer in the neural network is also called a node of the neural network. In other words, each hidden layer of the neural network includes one or more nodes. The plurality of hidden layers and sub-hidden layers in each hidden layer are arranged to create the neural network. This is further explained in detail in conjunction with FIGS. 6A, 6B, and 6C.

The neural network is then used to generate a plurality of test scenarios for the application being currently tested, at 308. The test scenarios may be generated using combinatorial analysis with Boolean operation "OR" at each node of the neural network. Each test scenario includes one node from one or more of the plurality of hidden layers. By way of an example, the neural network includes five hidden layers, one for each traditional human sense and each hidden layer further includes one or more nodes or sub-hidden layers. In this case, a test scenario would include five nodes, such that one node is selected from every hidden layer. This is further explained in detail in conjunction with FIGS. 6A, 6B, and 6C. It will be apparent to a person skilled in the art that the invention is not limited to combinatorial analysis with Boolean operation "OR" and other analysis methodologies and Boolean operations may also be used.

These test scenarios are tested for end to end validation of features of an application. This testing of scenarios not only validate all possible features of the applications but also provide inputs for enhancing, the application as well as the device running the application. In order to determine enhancement capabilities for the application or the device running the application, all the failed test scenarios are checked and it is determined whether new features which can be considered or added to the application. As a result, by using the above methodology an application can be made feature rich with respect to an end user by testing the application using human senses.

Figure 4:
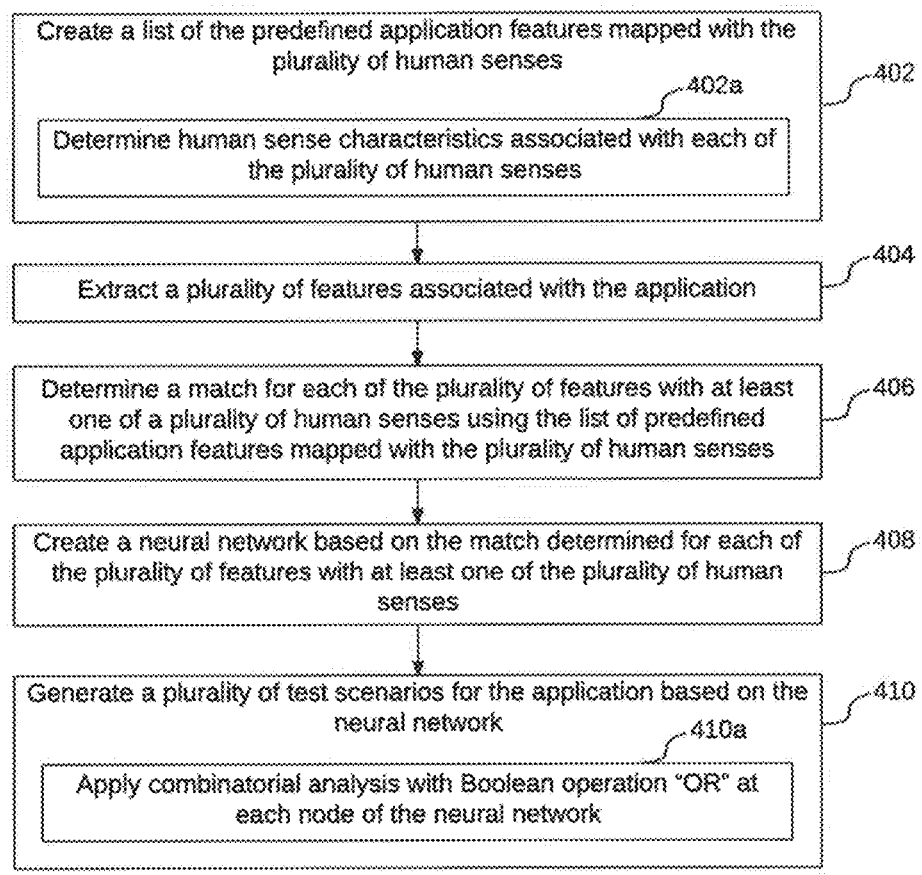
FIG. 4 illustrates a flowchart of a method for generating test scenarios to test an application, in accordance with another embodiment.

Referring now to FIG. 4, a flowchart of a method for generating test case scenarios for testing an application is illustrated, in accordance with another embodiment. At 402, a list that includes mapping of predefined application features mapped with a plurality of human senses is created. This has been explained in detail in conjunction with FIG. 3. This further includes determining human sense characteristics associated with each of the plurality of human senses at 402a. The list thus includes mapping of human sense characteristics associated with the human senses to predefined application features. This is explained in detail in conjunction with exemplary embodiment given in FIGS. 6A, 6B, and 6C.

Thereafter, at 404, a plurality of features associated with the application are extracted. The plurality of features are a subset of the predefined application features. In other words, each of the plurality of features would be a part of the predefined application features. At 406, the list is then used to determine a match for each of the plurality of features with one or more human sense characteristics associated with the plurality of human senses.

After determining the match, a neural network is created at 408, based on the match determined for each of the plurality of features with the one or more human sense characteristics. Based on the neural network, a plurality of test scenarios are generated at 410. Generating the test scenarios include applying combinatorial analysis with Boolean operation "OR" at each node of the neural network at 410a. This is further explained in detail in conjunction with FIGS. 6A, 6B, and 6C.

Figure 5:
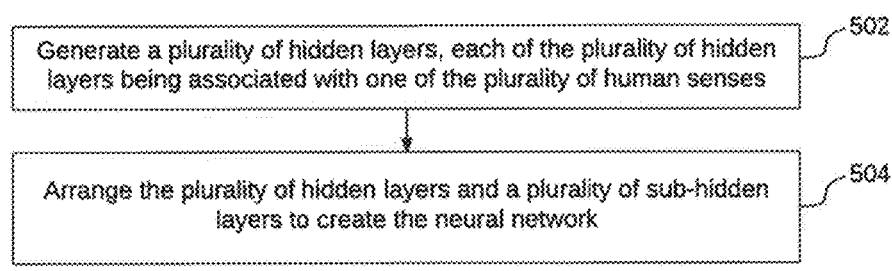
FIG. 5 illustrates a flowchart of a method of creating a neural network, in accordance with an embodiment.

Referring now to FIG. 5, a flowchart of a method for creating a neural network is illustrated, in accordance with an embodiment. At 502, a plurality of hidden layers are generated. Each of the plurality of hidden layers is associated with one of the plurality of human senses. By way of an example, one hidden layer is associated with each of the human senses of sight, hearing, touch, taste, and smell. Each hidden layer further includes one or more sub-hidden layers. A sub-hidden layers represents mapping between a human sense characteristic and a predefined application feature. By way of an example, pressure a human sense characteristic associated with the human sense of touch. Pressure is mapped to the following features of an application: 3D touch, vibrations, and touch screen. Every mapping represents one hidden layer, thus, the human sense characteristic of pressure has three sub-hidden layers associated with it.

Thereafter, at 504, the plurality of hidden layers and the plurality of sub-hidden layers are arranged in order to create the neural network. This is further explained in detail in conjunction with FIGS. 6A, 6B, and 6C.

Figure 6B:
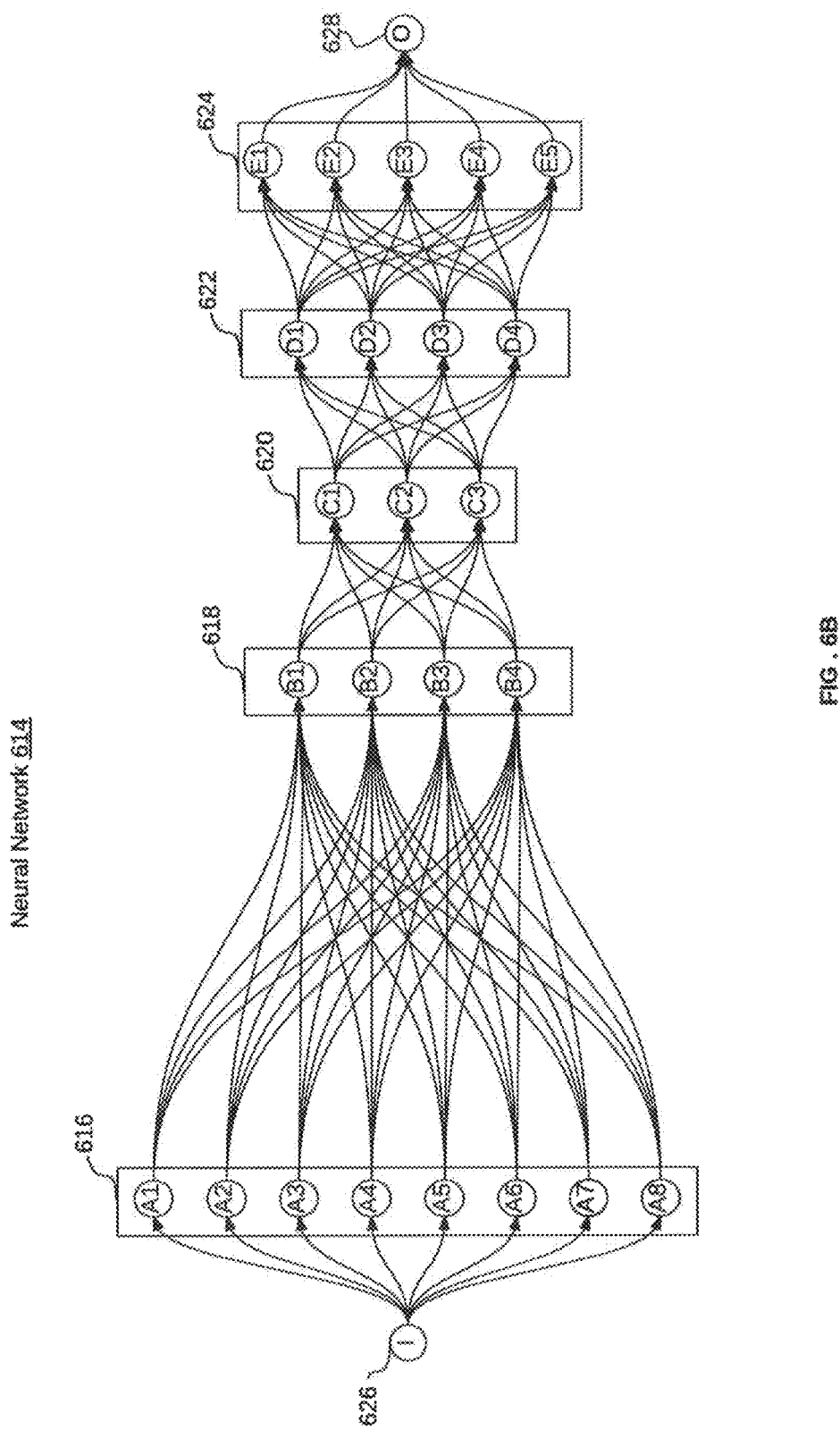

Referring now to FIGS. 6A, 6B, and 6C, illustrate creation of a neural network using mapping of application features to human sense characteristics and generation of test case scenarios for testing a mobile application, in accordance with an exemplary embodiment. In this exemplary embodiment, test scenarios are simulated using five senses of the human body which are extensively used when using an application on a mobile device.

FIG. 6A depicts a list 602 that includes mapping of human sense and human sense characteristics associated with predefined application features. List 602 includes a human sense column 604, a characteristics column 606, an application features column 608, a hidden layer column 610, and a sub-hidden layer column 612. Human sense column 604 includes the five traditional human senses, i.e., sight, smell, hear, touch, and taste, Each human sense is represented by a hidden layer of a neural network 614 depicted in FIG. 6B. The sense of sight is represented by a hidden layer A 616, smell is represented by a hidden layer B 618, hear is represented by a hidden layer C 620, touch is represented by a hidden layer D 622, and taste is represented by a hidden layer E 624. These hidden layers are also listed in hidden layer column 610 for each human sense given in FIG. 6A. Adjacent to human sense column 604 is characteristic column 606 that includes human sense characteristics associated with each human sense. These are inherent human sense characteristics listed in human sense column 604, keeping in mind that these human sense characteristics are relevant while using any mobile application.

The human sense of sight having sensors can detect color, size, shape and can also interpret information. Thus these are the human sense characteristics associated with the human sense of sight. Further, the smell organs having receptors can detect various smells and also stimulate memory cell. Thus, cognition and memory are the two main human sense characteristics associated with the human sense of smell. The human sense of hearing a sense through which one can hear voices and detect pressure. Thus, hearing and balance are the two main human sense characteristics associated with the human sense of hearing. Further, the human sense of touch (which can be felt through the skin of human body having receptors) may detect temperature and pressure, which are the main human sense characteristics associated with the human sense of touch. The taste buds can detect flavor, likes, dis-likes, and quantity. Thus these are the main human sense characteristics associated with the human sense of taste. It will be apparent to a person skilled in the art that the invention is not limited to the above listed human sense characteristics, which have been specifically selected for this exemplary embodiment.

The identified human sense characteristics associated with human senses are then mapped to mobile application features that can be receptive to the human senses. This mapping will enable in achieving realistic scenarios for mobile applications. The mobile application features ere listed in an application features column 608. As characteristics column 606 is placed adjacent to the application features column 608, the mapping between the human sense characteristics and the mobile application features is depicted.

With regard to the human sense of sight, the 'interpret info' human sense characteristic is mapped to user interface, camera, security features; the 'shape' human sense characteristic is mapped to graphics, the 'size' human sense characteristic is mapped to resolution, fonts, images; and the 'color' human sense characteristic is mapped to color combinations or the look and feel of the mobile application features. For the human sense of smell, the 'cognition' human sense characteristic is mapped to history of information that can be stored for an application (for example, personalized settings) and the 'memory' human sense characteristic is mapped to cache size, application size, and database size features for the mobile application, With regards to human sense of hear, the shear human sense characteristic is mapped to sounds and voice recognition, and the 'balance' human sense characteristic is mapped to screen orientation. For the human sense of touch, the 'temperature' human sense characteristic is mapped to sensor feature and the 'pressure' human sense characteristic is mapped to touch screen, 3D touch, and vibrations. Lastly, with regards to the human sense of taste, the 'flavor' human sense characteristic is mapped to operating system it can support (for example, iOS and Android), the 'quantity' human sense characteristic is mapped to load, the 'like' human sense characteristic is mapped to user friendly designed for particular community/groups, and the 'dis-like' human sense characteristic is mapped to unrelated mobile application features.

Each of these mapping of human sense characteristics to mobile application features represents a sub-hidden layer, which is depicted in a sub-hidden layer column 612. A sub-hidden layer is also termed as a node of neural network 614, By way of an example, when the human sense of 'hear' is considered, mapping of hear to sounds is represented by sub-hidden layer: C1 mapping of hear to voice recognition is represented by sub-hidden layer: C2, and mapping of balance to screen orientation is represented by sub-hidden layer: C3. Thus, the hidden layer C that represent the an sense of hear includes three sub-hidden layers, i.e., C1, C2, and C3. Each of these may also be termed as node C1, node C2, and node C3.

It will be apparent to a person skilled in the art that list 602 is used to determine, which of predefined mobile application features listed in application features column 608 are present in the mobile application being currently tested. Thereafter, a neural network is created using mapping of the mobile application features present in the mobile application being currently tested and human sense characteristics. However, in this exemplary embodiment, it is considered that all mobile application features listed in application features column 608 are also applicable to the mobile application being currently tested. Thus, neural network 614 is created using list 602.

Neural network 614 includes an input node 626 through which each feature identified as hidden layers are connected. Neural network 614 further include a hidden layer A 616, which is the first hidden layer and represents features mapped to human sense characteristics associated with the human sense of 'sight.' Hidden layer A 616 includes eight sub-hidden layers or nodes, i.e., A1, A2, A3, A4, A5, A6, A7, and A8. Hidden layer B 618 is the second hidden layer and represents features mapped to human sense characteristics associated with the human sense of 'smell.' Hidden layer 618 includes four sub-hidden layers or nodes, i.e., B1, B2, B3, and B4. As depicted in neural network 614 given in FIG. 6B, the input for each of sub-hidden layer node in hidden layer B 618, i.e., B1, B2, B3, and B4 is coming from each sub-hidden layer or node in hidden layer A 616, i.e., A1, A2, A3, A4, A5, A6, A7, and A8.

Further, neural network 614 includes hidden layer C 620, which is the third hidden layer and represents features mapped to human sense characteristics associated with the human sense of 'hear.' Hidden layer C 620 includes three sub-hidden layers or nodes, i.e., C1, C2, and C3. As depicted in neural network 614 given in FIG. 6B, the input for each of sub-hidden layer or node in hidden layer C 620, i.e., C1, C2, and C3 is coming from each sub-hidden layer or node in hidden layer B 618, i.e., B1, B2, B3, and B4.

Neural network 614 further includes hidden layer D 622, which is the fourth hidden layer and represents features mapped to human sense characteristics associated with the human sense of 'touch.' Hidden layer D 622 includes four sub-hidden layers or nodes, i.e., D1, D2, D3 and D4. As depicted in neural network 614 given in FIG. 6B, the input for each of sub-hidden layer or node in hidden layer D 622, i.e., D1, D2, D3, and D4 is coming from each sub-hidden layer or node in hidden layer C 620, C1, C2, and C3.

Lastly, neural net work 614 further includes hidden layer E 624, which is the fifth hidden layer and represents features mapped to human sense characteristics associated with the human sense of 'taste.' Hidden layer E 624 includes five sub-hidden layers or nodes, i.e., E1, E2, E3, E4, and E5. As depicted in neural network 614 given in FIG. 6B, the input for each of sub-hidden layer or node in hidden layer E 624, i.e., E1, E2, E3, E4, and E5 is coming from each sub-hidden layer or node in hidden layer 622 D1, D2, D3, and D4.

The connection of one node in a hidden layer to a node in a succeeding hidden layer in neural network 614 is such that the connection from one node to each node in the succeeding hidden layer acting as an input follows an alternating pattern of Boolean Value '1' and '0.' By way of an example, with regards to the node A1's connection to the nodes in hidden layer B 618, the node A1's connection to the node B1 is given a Boolean value of '1,' the node A1's connection to the node B2 is given a Boolean value of '0,' the node A1's connection to the node B3 is given a Boolean value of '1,' and the node A1's connection to the node B4 is given a Boolean value of '0.' Such assignment of Boolean values enables performing the Boolean operation 'OR' on neural network 614. It will be apparent to a person skilled in the art that other pattern of assigning Boolean values to such connection between nodes and other Boolean operations may also be used. It will be further apparent to a person skilled in the art that the invention is not limited to combinatorial analysis with Boolean operation "OR" and other analysis methodologies and Boolean operations may also be used.

Neural network 614 also includes an output node 628, through which each feature scenario for the mobile application is derived post performing the Boolean operations. After applying Boolean operation at each node of neural network 614 for the combination of hidden layers connected, the output received at output node 628 is depicted by a table 630 given in FIG. 6C. In this exemplary embodiment, a total of 1280 scenarios (320 such scenarios are depicted in table 630) are derived based on the Boolean "OR" operations at each node with value "1" and "0" assigned alternatively to connections between nodes in adjacent hidden layer. By way of an example, one of the scenarios may be A1→B1→C1→D1→E1.

Table 630 is generated when hidden layer A 616 is connected first followed by hidden layer B 618, hidden layer C 620, hidden layer D 622, and hidden layer E 624. Neural network 614's operation is repeated by switching the sub hidden layer's sequence one after the other. This is the automation test scenarios process that enables automatic generation of different such scenarios. By way of an example, scenarios in table 630 are generated when hidden layer A 616 is connected first. Thereafter, hidden layer B 618 is connected first followed by hidden layer C 620, hidden layer D 622, hidden layer E 624, and hidden layer A 618. Using this placement of hidden layer, a table similar to table 630 may be generated. By way of an example, in this table, scenarios may be depicted in the following order: B1→C1→D1→E1→A1. This pattern is repeated until all the hidden layers are switched having them first in the sequence and ensuring the sequence is followed. Once all the sequences are repeated, for every such sequence 1960 scenarios are derived and a total of 9600 scenarios are derived for the mobile application.

By way of an example, a scenario that has the sequence of A1→B1→C1→D1→E1, where A1 represent User Interface, B1 represents history, C1 represents sound, D1 represents sensors, and E1 represents iOS. This scenario may be interpreted as: when a mobile application compatible on iOS operating system senses the change in temperature, the mobile application shows temperature on the user interface comparing current and previous readings from history. Thereafter, the mobile application would sound an alert to the user. By way of another example, a scenario that has the sequence of C3→D2→E3→A7→B2, where C3 represents screen orientation, D2 represents touch screen, E3 represents android operating system, A7 represents images, and B2 represents cache. This scenario may be interpreted as: when on a mobile application compatible on Android operating system, a website is clicked through touch screen, frequently loaded images are shown faster and images are adjusted automatically when the screen orientation of the mobile device is changed.

These scenarios are to be tested for end to end validation of mobile application features. This testing of scenarios not only validates all possible features of the mobile applications but also provide inputs for enhancing the mobile application as well as mobile devices running the mobile application. The best way to determine the enhancement capabilities for a mobile application or a mobile device is to check all the failed test scenarios and see if there indeed is a new feature which can be considered.

Various embodiments of the invention provide methods and systems for testing application using human senses. By using human senses to test applications, we are bound to test most realistic scenarios. This not only will ensure success of the application but also would enhance these applications and the devices using these applications.

The specification has described systems and methods for augmented reality aware contents. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating test scenarios to test an application based on groups and sub-groups of application features, the method comprising:

identifying, via a feature identifier, a plurality of features associated with the application, wherein each of the plurality of features is a functionality of the application;

comparing, via a feature mapping processor, the identified plurality of features with a plurality of predefined application features, wherein the plurality of predefined application features are mapped with a plurality of groups comprising associated sub-groups, wherein a mapped group is used to interpret a corresponding predefined application feature and a mapped sub-group is an input to determine a corresponding group, wherein the plurality of groups include one or more of a smell group, a hearing group, a touch group, or a taste group, wherein the smell group comprises a plurality of predefined application smell features including personalized settings, cache, application size, and database size of the application, wherein the hearing group comprises a plurality of predefined application hearing features including sounds, voice recognition, and screen orientation of the application, wherein the touch group comprises a plurality of predefined application touch features including sensor feature, touch screen, 3D touch, and vibrations of the application, and wherein the taste group comprises a plurality of predefined application taste features including an operating system, load, design for particular user community, and non-functional features of the application;

creating, via a data structure processor, a data structure comprising a plurality of nodes arranged in a plurality of layers, wherein the data structure represents the mapping of the plurality of predefined application features with the plurality of groups and the corresponding sub-groups; and generating, via an automation processor, a plurality of test scenarios for the application by applying combinatorial analysis using a boolean operation at each of the plurality of nodes of the data structure, wherein each of the plurality of test scenarios represents a possible input pattern of all nodes within the data structure, and wherein an outcome of a test scenario represents an evaluation of the application based on the mapped groups and sub-groups.

2. The method of claim 1, wherein the application is at least one of a mobile application, a desktop application, infrastructure application, or a gaming application.

3. The method of claim 1, wherein creating the data structure comprises generating a plurality of hidden layers, each of the plurality of hidden layers being associated with one of the plurality of groups.

4. The method of claim 3, wherein each of the plurality of hidden layers comprises a plurality of sub-hidden layers, each of the plurality of sub-hidden layers being associated with mapping of one of the sub-groups with at least one of the plurality of predefined application features.

5. The method of claim 1, wherein generating the plurality of test scenarios further comprises applying combinatorial analysis with Boolean operation "OR" at each of the plurality of nodes of the data structure.

6. The method of claim 1, wherein the plurality of features is a subset of the plurality of predefined application features.

7. The method of claim 1, wherein the plurality of groups comprise a sight group, wherein the sight group comprises a plurality of predefined application sight features including user interface, image from camera, security, graphics, resolution, fonts, images, and color combination of the application.

8. The method of claim 7, wherein the sight group comprises a plurality of sub-groups, including a shape sub-group, a size sub-group, and a color sub-group, wherein the shape sub-group includes the graphics, wherein the size sub-group includes the resolution, the fonts, and the images, and wherein the color sub-group includes the color combinations.

9. An application testing system for generating test scenarios to test an application, the system comprising: at least one processor; and a computer-readable medium storing instructions that, when executed by the at least one processor, cause the at least one processor to perform operations comprising: identifying a plurality of features associated with the application, wherein each of the plurality of features is a functionality of the application;

comparing the identified plurality of features with a plurality of predefined application features, wherein the plurality of predefined application features are mapped with a plurality of groups comprising associated sub-groups, wherein a mapped group is used to interpret a corresponding predefined application feature and a sub-group is an input to determine a corresponding group, wherein the plurality of groups include one or more of a smell group, a hearing group, a touch group, or a taste group, wherein the smell group comprises a plurality of predefined application smell features including history, cache, application size, and database size of the application, wherein the hearing group comprises a plurality of predefined application hearing features including sounds, voice recognition, and screen orientation of the application, wherein the touch group comprises a plurality of predefined application touch features including sensors, touch screen, 3D touch, and vibrations of the application, and wherein the taste group comprises a plurality of predefined application taste features including an operating system, load, design for particular user community, and non-functional features of the application;

creating a data structure comprising a plurality of nodes arranged in a plurality of layers, wherein the data structure represents the mapping of the plurality of predefined application features with the plurality of groups and the corresponding sub-groups; and generating a plurality of test scenarios for the application by applying combinatorial analysis using a boolean operation at each of the plurality of nodes of the data structure, wherein each of the plurality of test scenarios represents a possible input pattern of all nodes within the data structure, and wherein an outcome of a test scenario represents an evaluation of the application based on the mapped groups and sub-groups.

10. The application testing system of claim 9, wherein the operations further comprise creating a list of the predefined application features mapped with the plurality of groups.

11. The application testing system of claim 10, wherein the operation of creating the list comprises operation of determining sub-groups associated with each of the plurality of groups, the sub-groups comprising at least one of interpretation of information, shape, size, color, cognition, memory, hearing, balance, temperature, pressure, flavor, quantity, like, or dislike.

12. The application testing system of claim 11, wherein the list comprises mapping of at least one of the sub-groups to at least one of the predefined application features.

13. The application testing system of claim 9, wherein the operation of creating the data structure comprises operation of generating a plurality of hidden layers, each of the plurality of hidden layers being associated with one of the plurality of groups.

14. The application testing system of claim 13, wherein each of the plurality of hidden layers comprises a plurality of sub-hidden layers, each of the plurality of sub-hidden layers being associated with mapping of one of the sub-groups with at least one of the plurality of predefined application features.

15. The application testing system of claim 9, wherein the operation of generating the plurality of test scenarios comprises operation of applying combinatorial analysis with Boolean operation "OR" at each node of the data structure, and wherein each of the plurality of test scenarios comprises one node from each of the plurality of hidden layers.

16. A non-transitory computer-readable storage medium for generating test scenarios to test an application, when executed by a computing device, cause the computing device to:
- identify, via a feature identifier, a plurality of features associated with the application, wherein each of the plurality of features is a functionality of the application;
- compare, via a feature mapping processor, the identified plurality of features with a plurality of predefined application features, wherein the plurality of predefined application features are mapped with a plurality of groups comprising associated sub-groups, wherein a mapped group is used to interpret a corresponding predefined application feature and a sub-group is an input to determine a corresponding group, wherein the plurality of groups include one or more of a smell group, a hearing group, a touch group, or a taste group, wherein the smell group comprises a plurality of predefined application smell features including history, cache, application size, and database size of the application, wherein the hearing group comprises a plurality of predefined application hearing features including sounds, voice recognition, and screen orientation of the application, wherein the touch group comprises a plurality of predefined application touch features including sensors, touch screen, 3D touch, and vibrations of the application, and wherein the taste group comprises a plurality of predefined application taste features including an operating system, load, design for particular user community, and non-functional features of the application;
- create, via a data structure processor, a data structure comprising a plurality of nodes arranged in a plurality of layers, wherein the data structure represents the mapping of the plurality of predefined application features with the plurality of groups and the corresponding sub-groups; and
- generate, via an automation processor, a plurality of test scenarios for the application by applying combinatorial analysis using a boolean operation at each of the plurality of nodes of the data structure, wherein each of the plurality of test scenarios represents a possible input pattern of all nodes within the data structure, and wherein an outcome of a test scenario represents an evaluation of the application based on the mapped groups and sub-groups.

* * * * *